Figure 1:
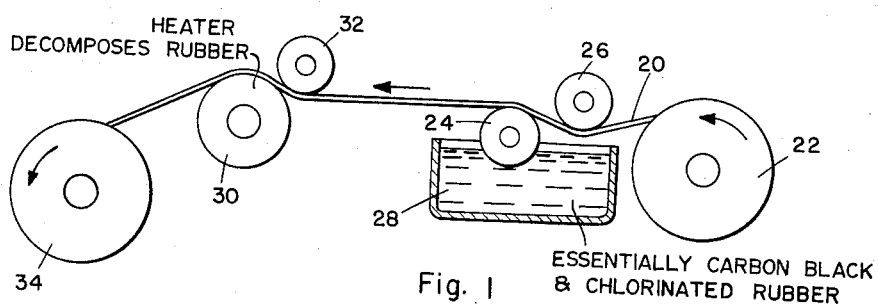

May 3, 1966　　　J. C. ARNOLD ET AL　　　3,249,459
HEAT-ABSORBENT COOKING FOIL AND METHOD OF MANUFACTURE
Filed May 3, 1963

INVENTORS
JAMES C. ARNOLD
BY　HARRY F. MILLER

Knox & Knox

United States Patent Office 3,249,459
Patented May 3, 1966

3,249,459
HEAT-ABSORBENT COOKING FOIL AND METHOD
OF MANUFACTURE
James C. Arnold, 8425 Pasco del Ocaso, La Jolla, Calif.,
and Harry F. Miller, Oceanside, Calif. (2223 Alta
Vista Drive, Vista, Calif.)
Filed May 3, 1963, Ser. No. 278,527
12 Claims. (Cl. 117—46)

The present invention relates generally to a heat-absorbent cooking foil and more particularly to such a foil having an adherent black coating on one surface thereof and to the method of manufacturing the same.

BACKGROUND

It has long been recognized that enhanced flavor and texture can be obtained in baked foods when they are wrapped in aluminum foil during the baking process. This improvement is brought about by the action of the foil in sealing in flavors and moisture. Unfortunately, aluminum foil has a bright heat-reflective surface which slows down the efficiency of the baking process. Thus, to complete the cooking process in a reasonable length of time, the oven temperature must be raised greatly, which increases the cost.

Attempts have been made to provide a black heat-absorbing surface on aluminum foil, but these have not met with complete success. It has been proposed to convert the surface of aluminum foil to a thin transparent layer of aluminum oxide by the well known electrolytic anodizing process and then to color this oxide with a suitable heat-absorbing dye. This is accomplished by reacting the oxide surface with one or the other of two classes of dyes known as diazo or alizarin type dyes. There are no black diazo or alizarin dyes so this process cannot be used to provide on effective heat-absorbent coating.

It has also been proposed to paint or enamel the surface of the foil to produce a heat-absorbent coating. Such a process would yield a surface which, because of the organic resin coating agents in paints and enamels, would break down and smoke, or even burn, at the temperatures encountered during the baking process.

In another attempt to get a black heat-absorbing surface on foil it has been proposed that the surface of the foil be printed with a dark heat-absorbing coating. Organic resin bonding and coating agents are required in the printing process. Such coatings are not stable at the higher baking temperatures and such a product would be impractical as a heat-absorbing material for use in baking foods.

OBJECTS

It is, accordingly, a primary object of this invention to provide an improved aluminum foil that has an effective heat-absorbing coating which can be used in the baking process at normal temperatures and times.

It is further an object of this invention to provide an improved process for producing an aluminum foil with a tenacious heat-absorbing coating thereon which will remain stable at temperatures encountered in the normal baking process.

Figure 2:
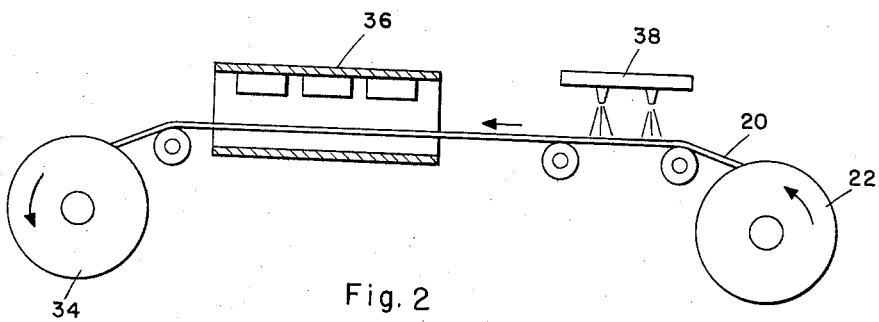

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

FIGURE 1 is a side view of one form of apparatus for applying a heat-absorbing coating to foil; and
FIGURE 2 is a side view of an alternative form.

Our improved process for manufacturing our heat-absorbent foil consists essentially of two steps. We first apply a coating to one side of the aluminum foil. This may be accomplished by spraying, roll coating or brushing. In this original coating material, only two ingredients are essential; carbon black and chlorinated rubber. Other materials including a solvent are used to aid in the ease of application or to remove the shine from the coating. The latter materials are called flatting agents and are fine inorganic powders such as aluminum silicate or colloidal silica. The organic materials that are used to aid in ease of application are plasticizers and synthetic resins.

After coating, the foil is subjected to a high temperature which drives off substantially all the plasticizer and resin. This temperature must be in excess of the cooking temperatures to be experienced in use of the material. The chlorinated rubber is partially decomposed and forms a black tightly adhering film around the carbon black and the flatting agent.

The following formulas illustrate several types of coating that are first applied to one side of the aluminum foil.

*Formula 1*

| | Parts |
|---|---|
| Carbon black | 1 |
| Aluminum silicate | 1 |
| Acrylic ester resin | 2 |
| Chlorinated rubber | 2 |
| Phthalate plasticizer | 2 |
| Mixed aromatic and chlorinated solvents | [1] 20–80 |

[1] According to method of application.

*Formula 2*

| | |
|---|---|
| Carbon black | 1 |
| Colloidal silica | 1 |
| Acrylic ester resin | 2 |
| Chlorinated rubber | 2 |
| Phthalate ester plasticizer | 2 |
| Mixed aromatic and chlorinated solvents | As in Formula 1 |

*Formula 3*

| | |
|---|---|
| Carbon black | 1 |
| Aluminum silicate | 1 |
| Chlorinated rubber | 2 |
| Butyl benzyl phthalate | 2 |
| Mixed aromatic and chlorinated solvents | As in Formula 1 |

*Formula 4*

| | |
|---|---|
| Carbon black | 1 |
| Aluminum silicate | 1 |
| Acrylic ester resin | 2 |
| Chlorinated rubber | 2 |
| Butyl benzyl phthalate | 2 |
| Mixed aromatic and chlorinated solvents | As in Formula 1 |

*Formula 5*

| | |
|---|---|
| Carbon black | 2 |
| Aluminum silicate | 1 |
| Acrylic ester resin | 1 |
| Chlorinated rubber | 3 |
| Butyl benzyl phthalate | 1 |
| Mixed aromatic and chlorinated solvents | As in Formula 1 |

*Formula 6*

| | |
|---|---|
| Carbon black | 1–2 |
| Flatting agent | 1–2 |
| Acrylic ester resin | 0–2 |
| Chlorinated rubber | 1–3 |
| Phthalate ester plasticizer | 0–2 |
| Mixed aromatic and chlorinated solvents | 20–80 |

With particular reference to Formula 1 as representative of how the process is applied to produce our novel heat-absorbing film, we first coat one surface of the foil with the composition referred to in said formula. This may be done by any one of several coating techniques such as spraying, roll coating or brushing. The film is then subjected to high heat, in the order of 650°–850° F. for a period of time, the higher the temperature the shorter the time of exposure. At 650° F. the time may be as long as 30 seconds and, as higher temperatures are used, the time becomes shorter so that at 850° F. the time may be as short as 5 seconds.

This high temperature treatment can be done in at least two different ways. In the first the solvents are evaporated, either in air or in a low temperature zone in a continuous oven heated by gas or electricity and the foil then travels into a high temperature zone where the desired thermal breakdown temperature is attained quickly. At this point the plasticizer, if used, is vaporized and dissipated. The acryl ester resin is thermally broken down, or depolymerized, and disappears also from the composition. The chlorinated rubber is partially decomposed to form a black, tightly adhering film around the carbon black and the flatting agent, which may be either aluminum silicate or colloidal silica.

As an alternative heating means we may use a bank of either infrared lamps or quartz lamps set at the proper distance in the oven to give the desired thermal breakdown temperatures.

After the high temperature treatment of our invention the black film has a radically different composition than that which was originally employed. For example, if Formula 1 was used originally, the coating composition on the finished foil would be:

EXAMPLE I

|  | Parts |
|---|---|
| Carbon black | 1 |
| Aluminum silicate | 1 |
| Partially decomposed chlorinated rubber | 2–x |

If Formula 2 was used, then the coating composition on the finished foil would be:

EXAMPLE II

|  | Parts |
|---|---|
| Carbon black | 1 |
| Colloidal silica | 1 |
| Partially decomposed chlorinated rubber | 2–x |

The size of $x$ in the above formulas is dependent on the amount of decomposition and is useable in the range between 0.1 and 0.5 so that the amount of partially decomposed rubber can range between 1.9 and 1.5 parts and still be a useful composition for the desired purpose.

In the same way Formulas 2, 3 and 4 will yield a final black coating composition similar to that yielded by Formula 1:

EXAMPLE III

|  | Parts |
|---|---|
| Carbon black | 1 |
| Flatting agent | 1 |
| Partially decomposed chlorinated rubber | 2–x |

Formula 6 illustrates the fact that the ratio between the various components of the original coating can be varied and still obtain a useful and efficient heat-absorbing coating on the final foil. Such finished coating has the composition range:

EXAMPLE IV

|  | Parts |
|---|---|
| Carbon black | 1–2 |
| Flatting agent | 1–2 |
| Partially decomposed chlorinated rubber | 0.75–2.85 |

In FIGURE 1 we have shown one form of apparatus for practicing our improved method. Aluminum foil in a continuous strip 20 is fed from a roll 22 by any suitable sheet or wet feeding apparatus (not shown). Strip 20 is carried over coating roller 24 and is held in contact therewith by pressure roller 26. Coating roller 24 rotates in a bath 28 of the coating composition and applies a thin layer to the under surface of strip 20, which is next passed over a heating roller 30 where the heat treatment step is performed. An idler roller 32 assures proper contact of the strip 20 with the heating roller 30, and from here the foil is fed to storage drum 34.

FIGURE 2 illustrates a modified apparatus. In this modification the basic coating composition is applied to the foil by spraying from tank 38 and the heating step is carried out in furnace 36 which may be supplied with any suitable form of heating elements. As in the prior described apparatus, the strip 20 is fed from a roll 22 and after processing is rolled onto a storage roll 34.

From the foregoing description it will be evident that the heat-stabilizing process of our invention can be applied to the original coating components when present in widely different percentages in the original mix and final useful coated foils can still be obtained. The finished black-coated foil is stable in the highest temperature encountered in baking ovens, with no further decomposition, and thus is a very efficient heat absorber.

It is understood that minor variations from the form of the invention disclosed herein may be made without departure from the spirit and scope of the invention, and that the specification and drawings are to be considered as merely illustrative rather than limiting.

We claim:

1. An article of manufacture for use as a material for wrapping food products to be cooked under conditions of radiant heat comprising:
   a sheet of thin aluminum foil, one side of which is provided with a coating consisting essentially of an adherent heat stable mixture of carbon black, an inorganic flatting agent and a binder of decomposed chlorinated rubber.

2. An article of manufacture for use as a material for wrapping food products to be cooked under conditions of radiant heat comprising:
   a sheet of thin aluminum foil, one side of which is provided with a coating consisting essentially of a mixture of 1 to 2 parts of carbon black, 1 to 2 parts of a flatting agent and 0.75 to 2.85 parts of decomposed chlorinated rubber.

3. An article as claimed in claim 1 in which said coating consists of 1 part of carbon black, 1 part of aluminum silicate and 1.7 parts of decomposed chlorinated rubber.

4. In a method of manufacturing a material for wrapping food products to be cooked under conditions of radiant heat, the steps comprising:
   coating one side of aluminum foil with a mixture of carbon black and chlorinated rubber, and
   heating the coated foil to a temperature in excess of the temperature at which said rubber decomposes.

5. A method according to claim 4 wherein said mixture includes aluminum silicate as a flatting agent.

6. A method according to claim 4 wherein said mixture includes colloidal silica as a flatting agent.

7. In a method of manufacturing a material for wrapping food products to be cooked under conditions of radiant heat, the steps comprising:
   coating one side of a thin sheet of aluminum foil with a mixture of carbon black, an inorganic flatting agent, chlorinated rubber and a solvent, and
   heating said foil to remove the solvent and decompose said rubber and to stabilize the adherence of the coating.

8. The method of claim 4 in which said coating is applied by rolling

9. The method of claim 4 in which said coating is applied by spraying.

10. The method of claim 4 in which the heat treatment is in the range of from 650°–850° F. and from 5 to 30 seconds.

11. In a method of manufacturing a material for wrapping food products to be cooked under conditions of radiant heat, the steps comprising:

coating one side of a thin sheet of aluminum foil with a mixture of carbon black, an inorganic flatting agent, an acrylic ester resin, chlorinated rubber, a plasticizer and a solvent;

removing the solvent; and heating the foil to remove substantially all the plasticizer and to break down and remove substantially all the acrylic ester resin and to partially break down and decompose the chlorinated rubber so that the latter forms a tight binder for the carbon black and flatting agent on the final surface.

12. A method as claimed in claim 11 in which the heat treatment is in the range of from 650°–850° F. and from 5 to 30 seconds.

References Cited by the Examiner

UNITED STATES PATENTS

| | | | |
|---|---|---|---|
| 2,398,108 | 4/1946 | Mott. | |
| 2,453,471 | 11/1948 | Switzer et al. | 220—64 X |
| 2,688,566 | 9/1954 | Arnold et al. | |
| 3,078,006 | 2/1963 | Price et al. | |
| 3,079,352 | 2/1963 | Atkins et al. | 117—133 X |

MURRAY KATZ, *Primary Examiner.*

RICHARD D. NEVIUS, J. R. BATTEN, JR.,
*Assistant Examiners.*